United States Patent

Michio

[11] 4,123,026
[45] Oct. 31, 1978

[54] OBJECT HOLDING DEVICE

[76] Inventor: Kawazoe Michio, 5-30-11, Narita Hihashi, Tokyo, Japan

[21] Appl. No.: 796,986

[22] Filed: May 16, 1977

[30] Foreign Application Priority Data

Jan. 29, 1977 [JP] Japan .............................. 52/9609[U]

[51] Int. Cl.$^2$ .............................................. A47F 5/00
[52] U.S. Cl. ............................. 248/316 E; 248/225.4; 354/126; 24/19
[58] Field of Search ..................... 248/230, 231, 74 A, 248/74 B, 225.4, 225.3, 316 E, 316 R; 354/293, 126; 24/19, 278, 268, 260

[56] References Cited

U.S. PATENT DOCUMENTS

| | | | |
|---|---|---|---|
| 1,090,929 | 3/1914 | McFaddin | 248/231 |
| 1,736,630 | 11/1929 | Scharpenberg | 24/19 |
| 2,839,668 | 6/1958 | Mills | 354/293 |
| 3,084,964 | 4/1963 | Ruth | 248/225.4 |
| 3,852,788 | 12/1974 | Veda | 354/126 |
| 3,999,055 | 12/1976 | Wakahara et al. | 354/293 |

Primary Examiner—Robert A. Hafer
Attorney, Agent, or Firm—Donald D. Mon

[57] ABSTRACT

A device used for removably attaching a strobe to a camera comprises a clamping band provided with a reinforcing plate and adapted to grasp the pillar-shaped grip of the strobe. The larger open end of a box attached to the camera has edges shaped to engage the pillar. The opposite end of the box is provided with inclined surfaces engageable by cooperating inclined surfaces of an operating lever held in position by a bolt which extends through the lever and the box and threads into the hole of the reinforcing plate. The lever has an operating handle which is permitted a degree of angular movement so that when it is turned in one direction the reinforcing plate is drawn into the open end of the box thereby tightening the band against the pillar of the strobe, and when the operating is lever is turned in the opposite direction the band is loosened.

7 Claims, 7 Drawing Figures

OBJECT HOLDING DEVICE

BACKGROUND OF THE INVENTION

The present invention relates generally to an object holding device and more particularly a holding device which is mounted on a camera as a main object and which has a function holding a strobo as an accessory object.

Hitherto, various devices for attaching an accessory object, for example a strobo to a main object, for example a camera were devised and put to practical use.

However, an object holding device is not yet devised, which has a function of unfastening and fastening in one motion member for holding an accessory object as well as a function of fixing an accessory object to a main object, wherein a relative position of an accessory object to a main object can be easily adjusted.

BRIEF SUMMARY OF INVENTION

Therefore, it is an object of the invention to provide an object holding device in which unfastening and fastening of holding member can be done in one motion, in the case of changing a relative position of an accessory object to a main object, height and direction.

Other objects and advantages of the invention will become apparent during the following discussion of the accompanying drawings.

DETAILED DESCRIPTION

Figure 1:
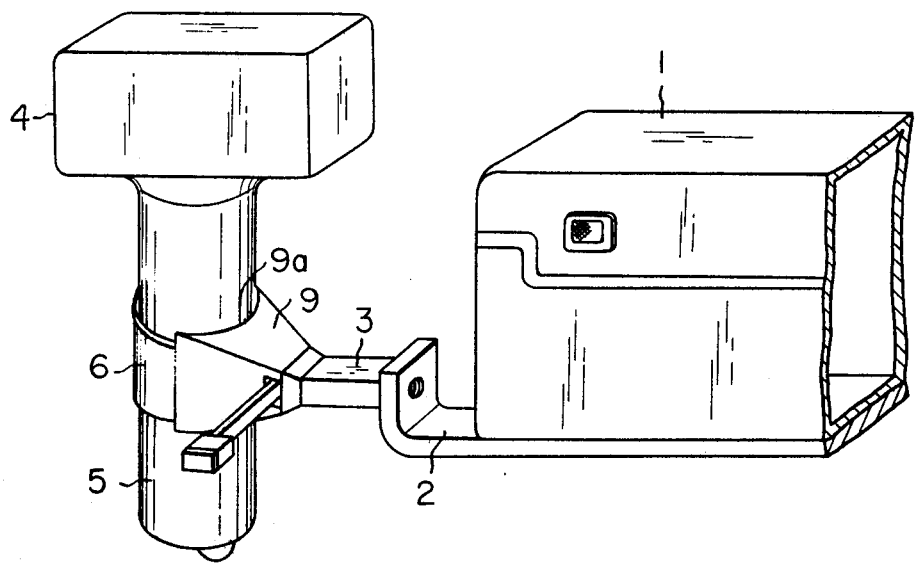
FIG. 1 is a perspective illustration of an object holding device according to this invention, shown along with a camera and a strobo which are connected by means of the object holding device.
Figure 2:
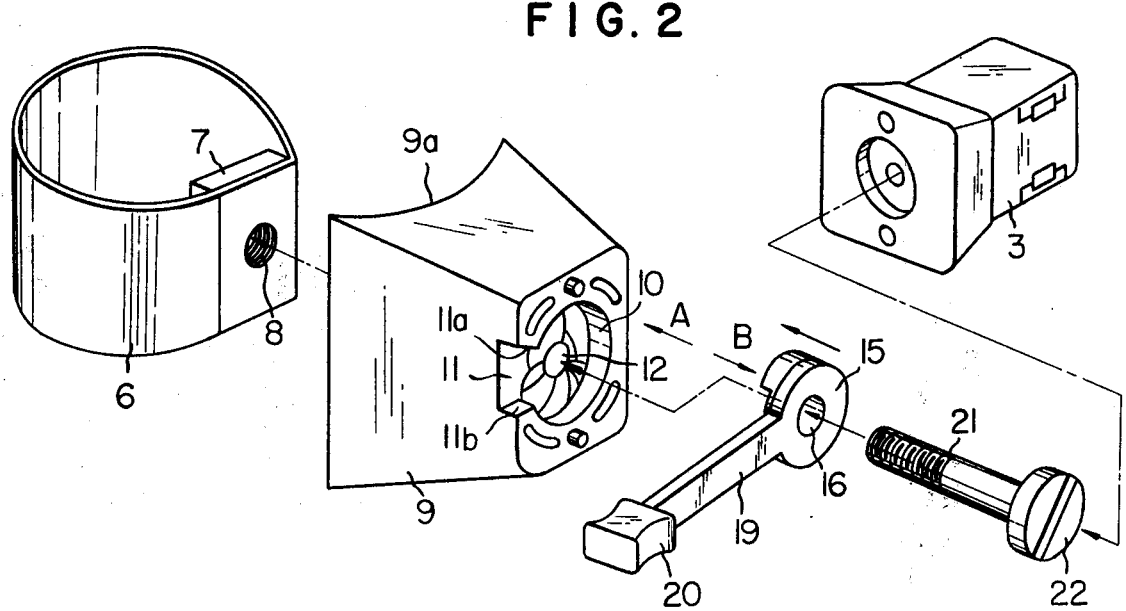
FIG. 2 is an exploded view of the object holding device.
Figure 3:
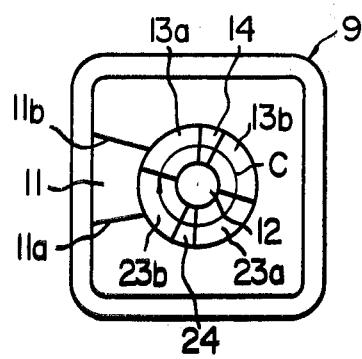
FIG. 3 is a perspective illustration of a holder taken in the direction of the arrow "A" of FIG. 2.
Figure 4:
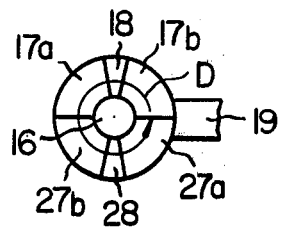
FIG. 4 is a perspective illustration of a disk taken in the direction of the arrow "B" of FIG. 2, FIGS. 5, 6 and 7 are cross-sectional views taken in the direction of the arrow along the circular line "C" of FIG. 3, and taken in the direction of the arrow long the circular line "D" of FIG. 4, showing a relation between a position of a holder and a position of a disk.
Figure 5:
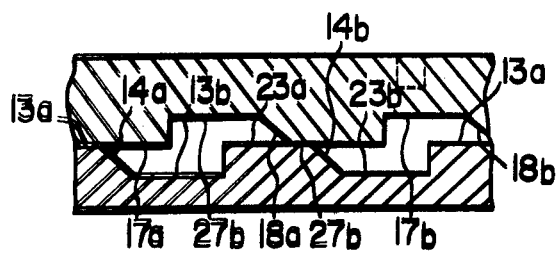
Figure 6:
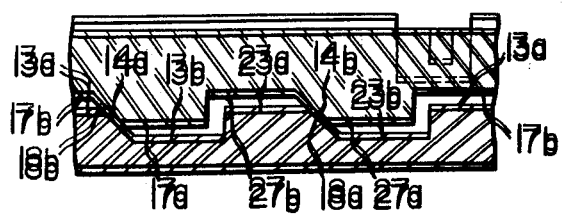
Figure 7:
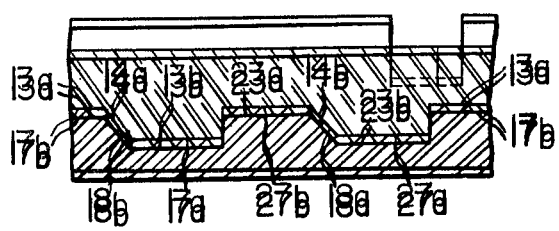

In the drawings, numeral 1 designates a camera as a main object. A bracket 2 is attached to the camera 1, and is equipped with joint box 3. Numeral 4 designates a strobo as an accessory object with a pillar-shaped grip 5. An annular clamping band 6 is put loosely on the pillar-shaped grip 5, and reinforcing plate 7 is locked on a part of inner-face of the annular clamping band 6. In the center of the reinforcing plate 7, screw-hole 8 is drilled. Numeral 9 designates a holder which comprises a box of the shape such as a truncated pyramid, the box having a closed top and an open base, an edge of the base having the curve 9a that comes into close contact with the surface of the grip 5, the top having a cylindrical hollow 10 with a bottom, a groove 11 for a stopper of an under-mentioned operating lever being made which links a part of a side face of the cylindrical hollow 10 with a peripheral face of the box. In the center of the bottom of the cylindrical hollow 10, a center-hole 12 is made through the bottom, and around the center-hole 12, a convex plane 13 an inclined plane 14, and a concave plane 13b are arranged in order of a convex plane 13a, an inclined plane 14, and a concave plane 13b. And a convex plane 23a, an inclined plane 24 a concave plane 23b are arranged so that they are symmetric with respect to the convex plane 13a, the inclined plane 14, and the concave plane 13b, respectively. (Refer to FIG. 3.) Numeral 15 designates a disk which is put rotatably in the cylindrical hollow 10. In the center of the disk 15, a center-hole 16 is made through the disk, and around the center-hole 16, a convex plane 17a, an inclined plane 18, and a concave plane 17b are arranged in the opposite direction to the direction of the arrangement of the convex plane 13a, the inclined plane 14, and the concave plane 13b. And a convex plane 27a, an inclined plane 28, and a concave plane 27b are arranged so that they are symmetric with respect to the convex plane 17a, the inclined plane 18, and the concave plane 17b. (Refer to FIG. 4.) Further, an end of an operating lever 19 is connected to the periphery of the disk 15. The handling end 20 of the operating lever 19 is protruded outward passing the groove 11. When the handling end 20 is moved up and down, the disk 15 is turned. Consequently, when the convex planes 17a and 27a are transferred from the position of the concave planes 13b and 23b to the position of the convex planes 13a and 23a passing the inclined planes 14 and 24, the position of the disk 15 is displaced in the direction of the axis. A headed connecting bolt 21 is inserted in both the center-hole 16 of the disk 15 and the bolt-hole 12 of the holder 9. An end of the headed connecting bolt 21 is screwed in a screw-hole 8 of the reinforcing plate 7, while a screw head 22 of the headed connecting bolt 21 is brought into contact with the disk 15. Accordingly, when the position of the disk 15 is displaced in the direction of the axis, the position of the reinforcing plate 7 is displaced through the bolt 21 so that the annular clamping band 6 is stretched. When one side of the operating lever 19 comes into contact with a stop face 11a, the convex planes 17a and 27a should be opposite to the convex planes 13a and 23a. On the other hand, when the other side of the operating lever 19 comes into contact with a stop face 11b, the convex planes 17a and 27a should be opposite to the concave planes 13b and 23b. An end surface of the holder can be joined with an end surface of the joint box, wherein the known joining means can be optionally applied for joining. Therefore herein an explanation of the joining means is eliminated.

Subsequently, the operation of the holding device according to the invention is explained.

If operator moves the operating lever 19 until one side of the operating lever 19 comes into contact with a stop face 11a, the convex planes 17a and 27a being opposite to the convex planes 13a and 23a, the annular clamping band 6 will be stretched toward the holder 9 which is in contact with the grip 5. Consequently, the grip 5 is rigidly clamped by both of the annular clamping band 6 which is stretched toward the holder 9 and the holder 9, so that the strobo 4 is rigidly fixed to the camera 1, with desired height and direction of the strobo 4.

However, where operator want to change height and direction of the strobo 4, if he moves the operating lever 19, turning the disk 15, the convex planes 17a and 27a will be travelled, through the slopes 14a and 14b from a position in which the convex planes 17a and 27a is opposite to the convex planes 13a and 23a to a position in which the convex planes 17a and 27a is opposite to the concave planes 13b and 23b, and when the other side of the operating lever 19 comes into contact with a stop face 11b, the convex planes 17b and 27b is completely opposite to the concave planes 13a and 23a. Accordingly, the disk 15 is axially displaced, with the result that the reinforcing plate 7 is axially displaced. Consequently, the shape of the annular clamping band 6 is changed in such a manner that the annular clamping band 6 is loosened and separates from the grip 5. Accordingly, the strobo 4 becomes free of the camera 1, so that height and direction of the strobo can be altered. After altering height and direction of the strobo, if operator again moves the operating lever 19 until one side of the operating lever 19 comes into contact with the stop face 11a, the annular clamping band 6 is stretched toward the holder 9 which is in contact with the grip 5. Consequently, the grip is rigidly clamped by both of the annular clamping band 6 and the holder 9, so that the strobo 4 is rigidly fixed to the camera 1.

In the above-mentioned embodiment, the grip exist on an accessory object. However, it goes without saying that a grip may exist on a main object, and that a main object and its accessory object is not defined to camera, and strobo and the like. In short, any sort of article will do, if pillar-shaped portion (a grip) exists on either a main object or an accessory object.

As described above, by means of an object holding device according to the present invention, unfastening and fastening of holding member can be done in one motion. Therefore height and direction an accessory can be easily and quickly.

What is claimed is:

1. An object holding device for removably attaching a main object to an accessory object where either the main object or the accessory object has a pillar-shaped portion comprising: an annular clamping band being put on the pillar-shaped portion of one of the two objects; a holder having one end which is joined with the other object and the other end which is pushed against the pillar-shaped portion through the annular clamping band, the one end of the holder having a cylindrical hollow with a bottom, a centerhole of the bottom being made through the bottom, a surface of the bottom having one or plural convex planes, one or plural concave planes, and one or plural inclined planes which are arranged in a given order; a disk which is put rotatably in the cylindrical hollow, the disk having an operating lever, a surface of the disk having one or plural convex planes, one or plural concave planes, and one or plural inclined planes which are arranged in such a manner that the surface of the disk engages the surface of the bottom; and a headed connecting bolt having a screw head brought into contact with the disk and having a shank passing through the disk and the holder, the end of said shank being joined with the annular clamping band.

2. A device for attaching an object having a pillar to a frame, comprising:
 (a) a stretchable band having a circumferential surface adapted to encircle the pillar;
 (b) a holder having a base with a curvature conforming with a surface of the pillar, and having a face containing a hollow at its end opposite the base and remote from the pillar;
   (i) said hollow having a base containing a group of surfaces arranged angularly around the center of said hollow, one of which is convex, another concave, and another inclined and located between the convex and concave surfaces;
   (ii) said holder having a central axis passing through its said face and the center of the hollow and intersecting the circumferential surface of the band;
 (c) means for attaching the holder to the frame;
 (d) a disk fitted into said hollow,
   (iii) said disk having a face juxtaposed to the base of the hollow, said disk face having a group of surfaces arranged angularly around the center of the disk, one of which is concave, another convex, and another inclined and located between the concave and convex surfaces;
 (e) means connecting the disk face to the band and holding the disk face against the base of the hollow;
 (f) a lever arm extending laterally from the disk by which the disk may be rotated on said axis relative to the holder;
 (g) a pair of stop surfaces spaced angularly apart from each other in the path of movement of the lever and positioned so that when the lever engages one of the stop surfaces the convex surfaces of the holder and the disk are in contact with each other and the concave surfaces of the disk and holder are substantially separated, thereby stretching the band and tightening it against the pillar, and when the lever engages the other of the stop surfaces, the convex surface of the disk is close to, or contacts, the concave surface of the holder, thereby relaxing the band and permitting removal of the pillar from the band.

3. A device according to claim 2 in which the convex, concave and inclined surfaces of the disk are adapted to register with the concave, convex and inclined surfaces, respectively, of the holder.

4. A device according to claim 2 in which the means connecting the disk face to the band and holding the disk face against the base of the hollow comprises a fastener located along said axis.

5. A device according to claim 2 in which the means for attaching the holder to the frame comprises a joint box.

6. A device according to claim 2 in which said hollow contains a second group of surfaces arranged angularly around said axis, comprising a convex, a concave and an inclined surface therebetween, and the disk face contains a second group of surfaces arranged angularly around the axis, comprising a concave, a convex and an inclined surface therebetween.

7. A device according to claim 2 in which the stop surfaces comprise walls of a groove in the face of the holder containing the hollow, said groove communicating with the hollow, said lever arm passing through said groove.

* * * * *